(12) United States Patent
Amendola et al.

(10) Patent No.: US 8,802,304 B2
(45) Date of Patent: Aug. 12, 2014

(54) BIFUNCTIONAL (RECHARGEABLE) AIR ELECTRODES COMPRISING A CORROSION-RESISTANT OUTER LAYER AND CONDUCTIVE INNER LAYER

(75) Inventors: Steven Amendola, Easton, PA (US); Michael Binder, Brooklyn, NY (US); Phillip J. Black, McConnellsburg, PA (US); Stefanie Sharp-Goldman, East Brunswick, NJ (US); Lois Johnson, Edison, NJ (US); Michael Kunz, Saylorsburg, PA (US); Michael Oster, Red Bank, NJ (US); Tesia Chciuk, Bethlehem, PA (US); Regan Johnson, Fairield, PA (US)

(73) Assignee: Eos Energy Storage, LLC, Edison, NJ (US)

( * ) Notice: Subject to any disclaimer, the term of this patent is extended or adjusted under 35 U.S.C. 154(b) by 286 days.

(21) Appl. No.: 12/854,131

(22) Filed: Aug. 10, 2010

(65) Prior Publication Data

US 2012/0040254 A1 Feb. 16, 2012

(51) Int. Cl.
*H01M 4/02* (2006.01)
*H01M 4/66* (2006.01)
*H01M 2/18* (2006.01)
*B05D 5/12* (2006.01)

(52) U.S. Cl.
USPC .............. 429/405; 429/246; 429/233; 427/77

(58) Field of Classification Search
USPC ............ 429/219, 231.95, 406, 105, 217, 163, 429/511, 67, 218.1, 405, 246, 233; 205/150, 183; 204/490; 428/553
See application file for complete search history.

(56) References Cited

U.S. PATENT DOCUMENTS

| 2,654,795 A | * | 10/1953 | Solomon et al. ............... 429/219 |
| 3,849,868 A | | 11/1974 | Jost |
| 4,038,458 A | | 7/1977 | Jacquelin |
| 4,041,211 A | | 8/1977 | Wiacek |
| 4,042,481 A | | 8/1977 | Kelly |
| 4,096,318 A | | 6/1978 | Wurmb et al. |
| 4,101,718 A | | 7/1978 | Tamura et al. |

(Continued)

FOREIGN PATENT DOCUMENTS

| DE | 1805022 | 5/1969 | |
| EP | 1850412 A1 | * 10/2007 | ............. H01M 8/02 |

(Continued)

OTHER PUBLICATIONS

"Nickel containing perovskites", Fratello et al., Journal of Crystal Growth, vol. 166, Issues 1-4, Sep. 1996, pp. 878-882.*

(Continued)

*Primary Examiner* — Kenneth Douyette
(74) *Attorney, Agent, or Firm* — Honigman Miller Schwartz and Cohn LLP; Andrew N. Weber; Jonathan P. O'Brien

(57) ABSTRACT

Performance, properties and stability of bifunctional air electrodes may be improved by using modified current collectors, and improving water wettability of air electrode structures. This invention provides information on creating non-corroding, electrically rechargeable, bifunctional air electrodes. In some embodiments, this bifunctional air electrode includes a corrosion-resistant outer layer and an electrically conductive inner layer. In some embodiments, this bifunctional air electrode includes titanium suboxides formed by reducing titanium dioxide. Titanium suboxides may be corrosion-resistant and electrically conductive.

25 Claims, 4 Drawing Sheets

(56) References Cited

U.S. PATENT DOCUMENTS

| | | | |
|---|---|---|---|
| 4,152,489 A * | 5/1979 | Chottiner | 429/406 |
| 4,168,349 A | 9/1979 | Buzzelli | |
| 4,341,848 A * | 7/1982 | Liu et al. | 429/406 |
| 4,463,067 A | 7/1984 | Feigenbaum | |
| 4,503,132 A * | 3/1985 | Struthers | 429/511 |
| 4,842,963 A | 6/1989 | Ross | |
| 4,948,682 A * | 8/1990 | Sonneveld | 429/67 |
| 5,049,457 A | 9/1991 | Niksa et al. | |
| 5,126,218 A | 6/1992 | Clarke | |
| 5,188,712 A | 2/1993 | Dilmore et al. | |
| 5,232,798 A | 8/1993 | Goldstein et al. | |
| 5,242,763 A | 9/1993 | Konishi et al. | |
| 5,306,579 A | 4/1994 | Shepard et al. | |
| 5,460,896 A | 10/1995 | Takada et al. | |
| 5,521,029 A * | 5/1996 | Fiorino et al. | 205/150 |
| 5,560,999 A | 10/1996 | Pedicini et al. | |
| 5,716,726 A | 2/1998 | Cheiky | |
| 6,051,328 A | 4/2000 | Witzigreuter et al. | |
| 6,235,418 B1 | 5/2001 | Pedicini | |
| 6,265,094 B1 | 7/2001 | Pedicini et al. | |
| 6,689,711 B2 | 2/2004 | Lefebvre | |
| 6,716,331 B2 | 4/2004 | Chikuma | |
| 7,238,448 B1 | 7/2007 | Kaplan et al. | |
| 7,314,685 B2 | 1/2008 | Brown et al. | |
| 7,396,440 B2 | 7/2008 | Amendola | |
| 7,582,385 B2 | 9/2009 | Clarke | |
| 2001/0014416 A1 | 8/2001 | Faris et al. | |
| 2001/0023036 A1 | 9/2001 | Faris et al. | |
| 2002/0031701 A1 | 3/2002 | Kawakami et al. | |
| 2002/0031705 A1 * | 3/2002 | Tucholski | 429/163 |
| 2002/0142203 A1 | 10/2002 | Ma et al. | |
| 2003/0113632 A1 | 6/2003 | Brown et al. | |
| 2003/0162087 A1 * | 8/2003 | Clarke et al. | 429/105 |
| 2004/0202931 A1 | 10/2004 | Christian et al. | |
| 2004/0247969 A1 | 12/2004 | Faris et al. | |
| 2005/0121655 A1 | 6/2005 | Bugnet et al. | |
| 2005/0208386 A1 | 9/2005 | Clarke | |
| 2006/0108214 A1 | 5/2006 | Amendola | |
| 2006/0141340 A1 | 6/2006 | Takeuchi et al. | |
| 2007/0003833 A1 * | 1/2007 | Li et al. | 429/218.1 |
| 2007/0196260 A1 | 8/2007 | Kikkawa et al. | |
| 2007/0202403 A1 * | 8/2007 | Oh et al. | 429/217 |
| 2007/0256932 A1 | 11/2007 | Martin et al. | |
| 2008/0044640 A1 | 2/2008 | Wang Chen | |
| 2008/0096061 A1 | 4/2008 | Burchardt | |
| 2008/0096074 A1 | 4/2008 | Wu | |
| 2008/0182176 A1 | 7/2008 | Aurbach et al. | |
| 2009/0272645 A1 | 11/2009 | Yang et al. | |
| 2010/0015473 A1 | 1/2010 | Hendriksen et al. | |
| 2012/0021303 A1 | 1/2012 | Amendola et al. | |
| 2012/0034515 A1 | 2/2012 | Kang et al. | |
| 2013/0115531 A1 | 5/2013 | Amendola et al. | |

FOREIGN PATENT DOCUMENTS

| | | |
|---|---|---|
| WO | WO 2005/004260 | 1/2005 |
| WO | WO 2007/065899 | 6/2007 |
| WO | WO 2007/144357 | 12/2007 |
| WO | 2010/118586 | 10/2010 |
| WO | 2012/012558 | 1/2012 |
| WO | 2013/112660 | 8/2013 |

OTHER PUBLICATIONS

"Protective Coatings Based on Mn—Co Spinel for Current Collectors of Solid Oxide Fuel Cells", Bredikhin et al., Russian Journal of Electrochemistry, 2009, vol. 45, No. 5, pp. 520-526.*

"Exoemission and catalytic activity of oxides with perovskite and spinel structures in the oxidation of CO and hydrocarbons", Leninskie Gory, Russian Chemical Bulletin, International Edition, vol. 51, No. 1, pp. 46-53, Jan. 2002.*

International Search Report for PCT/US2011/044715 Dated Feb. 24, 2012.

International Search Report for PCT/US2011/047137 Dated Feb. 29, 2012.

International Search Report for PCT/US2012/069677 Dated Jun. 19, 2013.

International Search Report for PCT/US2013/022852 Dated May 29, 2013.

\* cited by examiner

BIFUNCTIONAL (RECHARGEABLE) AIR ELECTRODES COMPRISING A CORROSION-RESISTANT OUTER LAYER AND CONDUCTIVE INNER LAYER

BACKGROUND OF THE INVENTION

Oxygen reduction and/or oxygen evolution are key electrochemical reactions in fuel cells, rechargeable metal air batteries, water electrolysis systems, and chlor-alkali cells. A key component in these systems is the air electrode. Air electrodes may be designed to be bifunctional. The term bifunctional means that this air electrode may act as either as a cathode or an anode in a battery, fuel cell or other cells depending on which way electric current flows at any given time. Thus when acting as a cathode and accepting electrons from an outside source, it allows oxygen to be reduced to hydroxide ions. When acting as an anode, and electrons are delivered to external circuits, it oxidizes hydroxide ion in water to oxygen gas.

The following equations describe the reactions that may take place at a bifunctional electrode:

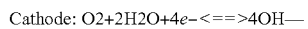

Cathode: $O2+2H2O+4e- <==> 4OH—$

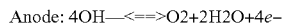

Anode: $4OH— <==> O2+2H2O+4e-$

An air electrode, sometimes called a gas-diffusion electrode, is generally a porous, thin, lightweight, plate or sheet-like structure (typically about 0.05" thick) that serves as a barrier to separate liquid electrolyte within an electrochemical system from surrounding, ambient air. One of the sides faces ambient air (oxygen) while the other side faces a liquid (generally aqueous) electrolyte. These two sides are deliberately designed to have differing water wetting properties and functions. The side facing ambient air is generally porous, air permeable, and deliberately made hydrophobic (water repelling). The opposite face—the side facing aqueous liquid electrolyte—is generally hydrophilic (water attracting). A current collector, sandwiched within/between these two regions, is designed to carry electrons to and from the air electrode. Characteristics of gas-diffusion electrodes may be strongly influenced by chemical and physical properties near/in its surface region. This invention disclosure describes ways of improving performance characteristics of bifunctional air electrodes.

SUMMARY OF THE INVENTION

An aspect of the invention is directed to a bifunctional air electrode for a metal-air battery or cell, said air electrode comprising at least one current collector having a corrosion-resistant outer layer and a conductive inner layer; and an air permeable, hydrophobic membrane, wherein the corrosion-resistant outer layer has a greater corrosion resistance than the conductive inner layer and the conductive inner layer has a higher level of electrical conductivity than the corrosion-resistant outer layer.

Another aspect of the invention provides a metal-air battery. The metal-air battery may comprise a metal electrode; a bifunctional air electrode; and aqueous electrolyte between the metal electrode and the bifunctional air electrode, wherein the bifunctional air electrode has a titanium current collector, with a titanium suboxide formed on current collector.

A metal-air battery may be provided in accordance with an additional aspect of the invention. The metal air battery may comprise a metal electrode; an air electrode; and aqueous electrolyte between the metal electrode and the air electrode, wherein the air electrode has a metal current collector with a corrosion-resistant outer layer and a conductive inner layer.

An aspect of the invention may also provide a method for forming a bifunctional air electrode for a metal-air battery, said method comprised of providing a titanium current collector of the bifunctional air electrode; and reducing a titanium dioxide film that is formed on the titanium current collector to create a conductive titanium suboxide on a surface of the titanium current collector.

In accordance with an additional aspect of the invention, a battery cell may comprise a first electrode; a second electrode; and aqueous electrolyte between the first electrode and second electrode so that the first electrode has an electrolyte-facing side and a non electrolyte-facing side, wherein the first electrode has a current collector including a porous substrate and porous backing on the electrolyte-facing side. In some embodiments, a stack of battery cells may be provided. The stack may comprise a first battery cell, a second battery cell underlying the first battery cell, wherein the second battery cell includes: a third electrode and a fourth electrode; and aqueous electrolyte between the third electrode and the fourth electrode, wherein the third electrode has a current collector including a porous substrate.

Other goals and advantages of this invention will be further appreciated and more readily understood when considered in conjunction with the following description and accompanying drawings. While the following description contains specific details describing particular embodiments of this invention, it should not be construed as limiting the scope of this invention but rather as an exemplification of preferable embodiments. For each aspect of the invention, many variations are possible as suggested herein and well known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

While preferable embodiments of the invention have been shown and described herein, it will be obvious to those skilled in the art that such descriptions are merely exemplary in nature and not intended to limit the scope, applications, or uses of this invention in any way. Embodiments are provided by way of example only. Numerous variations, changes, and substitutions will occur to those skilled in the art without departing from this invention. It should be understood that various alternatives to the embodiments of the present invention described herein may be employed in practicing the invention. The present invention will be more fully understood from the detailed descriptions and accompanying drawings herein.

This invention provides for an electrically rechargeable bifunctional air electrode. Various aspects of the invention described herein may be applied to any of the particular applications set forth below or for any other types of metal air battery cells or other types of battery systems. Improved structure and composition of bifunctional air electrodes, as well as methods for making them, may be provided. This invention may be applied as a standalone system or method, or as part of a renewable energy storage system or method of energy storage. It shall be understood that different aspects of this invention can be appreciated individually, collectively, or in combination with each other.

Figure 1:
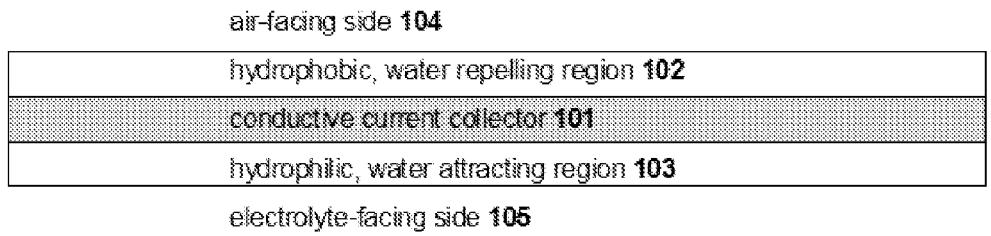
FIG. 1 provides a side view of an air electrode.

FIG. 1 provides a side view (not drawn to scale) of an air electrode. Air electrodes may be visualized as having a porous air-facing side 104 that contacts the ambient air and an electrolyte-facing side 106 that contacts the electrolyte. The air-facing side is generally opposite the electrolyte-facing side. The air electrode generally includes a current collector 101 that is embedded within the thin air electrode structure. This current collector may preferably be formed of electrically conductive material such as a metal, metal oxide, carbon-based materials, or metal carbides, that have suitable electrical conductivities (generally about $10^3$ S/m or greater, $10^4$ S/m or greater, $10^5$ S/m or greater, $10^6$ S/m or greater, $10^7$ S/m or greater, or $5\times10^7$ S/m or greater).

The air electrode may have a hydrophobic, water repelling region 102 and a hydrophilic, water attracting region 103. The side facing ambient air may be deliberately made hydrophobic (water repelling) while the side facing liquid electrolyte is hydrophilic (water attracting). In some embodiments, both sides of the air electrode may have hydrophobic regions and/or both sides may have hydrophilic regions. Alternatively, one or more sides, or a portion of one or more sides, may be left untreated and need not have hydrophilic or hydrophobic regions. In some embodiments, the hydrophobic or hydrophilic regions may be less than, equal to, or greater than the thickness of the current collector.

In some embodiments, the current collector may range in thickness from about 0.0001 inches to 1 inch thick. For example, the current collector may be less than, greater than, or be about 0.0001 inches, 0.0005 inches, 0.001 inches, 0.005 inches, 0.01 inches, 0.03 inches, 0.05 inches, 0.07 inches, 0.1 inches, 0.15 inches, 0.2 inches, 0.3 inches, 0.5 inches, or 1 inches thick. Hydrophobic and/or hydrophilic regions may be from 0.1%, to as much as 75% of the current collector thickness. For example, the hydrophobic and/or hydrophilic regions may be greater than, less than, or be about 0.1%, 0.5%, 1%, 5%, 10%, 15%, 20%, 30%, 40%, 50%, or 75% of the current collector thickness.

The current collector may include a metal selected from the group including: titanium, zirconium, rhenium, rhodium, iridium or ruthenium. The current collector need not be a metal per se and may include other electrically conductive species such as conductive polymers, silicon, carbides, other carbon-based conductive materials such as graphite, and even metals that are coated with any of the above listed materials to protect it from corrosion. The selected current collector may have an exposed surface, which may include a metal or material selected from the group described or other materials discussed elsewhere herein.

The current collector may itself form or include a suitable substrate. In some embodiments, the current collector may comprise a perforated structure, an expanded or mesh screen, a woven structure, pressed or sintered powder, a porous sandwich formulation that may provide additional surface area, a shell, or a fabric encasing one or more layers. Any of the materials described elsewhere herein may be used with these structures. For example, a current collector may include a perforated metal structure, an expanded screen, a woven metal structure, a plastic shell, or a fabric encasing a conductive inner layer and carbon. Additionally, the plastic shell may be hydrophilic on the bottom (or electrolyte-facing side) and hydrophobic on top (or air-facing side). In some embodiments, the fabric may be configured like a tea bag. In some examples, the current collector may be a perforated or woven conductive polymer or conductive carbon structure. The current collector may include pores, channels, passages, surface features, or permeable materials. In some instances, current collectors may even include non-porous or impermeable portions or regions.

The air facing side of an air electrode may be generally composed of porous, electrically conductive material, typically activated carbons and carbon blacks. Other examples of air electrode materials on the air-facing side may include conducting polymers, pressed metal powders, or pressed metal oxide powders. Air electrode materials may be held together with suitable binders. For example, polymer binders such as Teflon, poly vinylidene fluoride or other materials known in the art may be used. A hydrophobic, wet-proofed gas region may be designed to have high porosity so that ambient air (containing ~20% oxygen gas) may readily diffuse through hydrophobic channels in this layer. Generally, a hydrophobic barrier is achieved by laminating or gluing a suitable, thin, porous, hydrophobic polymer layer on air facing electrode surfaces. This thin, porous film typically allows air to enter the air electrode while still providing hydrophobic properties. The thin, porous film may have one or more pores or channels that may provide a passageway for air to enter. In some embodiments, the air-facing thin, porous film may have a thickness of about 10 to 100 microns.

The electrolyte-facing side of an air electrode is generally hydrophilic and may also be made of any number of porous conductive materials (that may or may not be the same as the materials on the air facing side). Materials used to make the electrolyte facing side could include but not limited to pressed carbon black, graphite, conducting polymers, carbon nanotubes, Magneli phase titanium oxides such as $Ti_4O_7$, conducting cloths (of various materials), pressed or sintered metal particles, pressed or sintered metal oxide particles. Also dispersed in this region may be finely divided, high surface area solid catalysts specifically chosen for their ability to catalyze electrochemical reduction of oxygen gas. Since this active catalyst region is hydrophilic, liquid electrolyte may readily enter this region in the electrode via capillary forces in the narrow hydrophilic pore structures. The electrolyte-facing portion of the air electrode may contact a liquid electrolyte and/or may be soaked with electrolyte. Because the electrolyte-facing portion of an air electrode may be partially soaked with electrolyte, it readily allows transport of reactants/products through liquid electrolytes to/from actual sites where oxygen reduction may occur.

An air electrode may be multifunctional. The porous, air-facing side may be permeable to oxygen gas from the atmosphere but simultaneously impermeable to electrolyte so that electrolyte remains within the cell. For example, electrolyte that may be drawn into a hydrophilic region of the air electrode does not readily cross over into a hydrophobic region of the air electrode. Preferably, liquid electrolyte does not wet the air-facing side. This is because oxygen permeability through liquids is generally low. If the air facing side were to become wet with liquid electrolyte (a condition known as "flooding"), oxygen permeation would become severely restricted and cell performance (which relies on oxygen gas entering and leaving the air electrode) would be markedly impaired.

In some embodiments, the air-facing side of a bifunctional air electrode may have different air permeabilities than the electrolyte-facing side. In some embodiments, the electrolyte facing side may be non-porous and impermeable.

One or more of these operating parameters may pose somewhat stringent requirements to constructing a bi-polar air electrode: one side must be highly porous and permeable to gaseous oxygen while simultaneously avoiding electrolyte leakage and unwanted electrolyte flooding. This bi-polar electrode could preferably be electrically conductive and possesses enough mechanical strength to withstand hydrostatic pressure changes that occur within liquid electrolytes during oxidation and reduction. For example, pressure differentials normally occur on the electrolyte-facing side of the air electrode during electrolyte expansion and contraction (i.e., during cell discharging or charging). The bifunctional electrode could preferably be rugged enough to withstand these pressures the electrolyte preferably would not seep into the air-facing side of the electrode. This may be accomplished by a suitable liquid electrolyte management system and architecture as described in patent application Ser. No. 12/841,115 filed on Jul. 21, 2010, which is hereby incorporated by reference in its entirety. It preferably also contains suitably active and long lived catalyst for electrochemical reduction of oxygen while in contact with the electrolyte. The current collector preferably remains stable and nonreactive in the electrolyte even under changes in applied potentials.

During oxygen reduction, oxygen gas from incoming ambient air passes through the electrolyte-free, hydrophobic pores of the air facing side and diffuses further into the electrode structure. As oxygen reaches the hydrophilic region, it may simultaneously come in contact with solid dispersed catalysts and liquid electrolyte. This reaction may involve the coordinated joining of oxygen gas at a triple phase boundary of three components—gas, liquid and solid. In some embodiments, the gas phase is oxygen gas; the solid phase is the solid catalyst; while the liquid phase is the aqueous electrolyte. Generally, most catalysts in these systems may be solid and dispersed more or less evenly throughout the catalyst region. Solid catalysts may include but not limited to manganese, cobalt, silver, iron, copper, nickel and other transition and rare earth oxides as well as silver, platinum, ruthenium, palladium metals or other materials known to be oxidation catalysts as well as any suitable mixtures or alloys of the above materials. The embedded current collector, in contact with the conductive matrix and catalyst, can then deliver current generated by oxygen reduction to external circuits.

If an air electrode is used to not only reduce oxygen but also generate oxygen from water, it is called a bifunctional electrode. Bifunctional air electrodes serve dual roles—acting as a cathode to reduce oxygen gas from ambient air (during cell discharge) and as an anode to oxidize aqueous electrolyte to generate oxygen gas (during cell charging). When acting as a cathode, an air electrode causes oxygen gas from the atmosphere to undergo reduction. During the reverse electrochemical reaction, the air electrode may act as an anode to perform oxidation of the aqueous electrolyte to generate oxygen gas.

Characteristics and performance of bifunctional air electrodes may depend on the various transporting processes taking place within the porous gas layer, on the activity of catalysts used, and structure of electrode substrates. Characteristics of the gas-diffusion electrode may be strongly influenced by hydrophobic properties in its surface region. Various ways of improving bifunctional air electrodes may be provided.

Use of Titanium Metal as Air Electrode Current Collector

One reason battery technologists have not traditionally considered aqueous, chloride based electrolytes for room temperature, rechargeable metal air battery systems is because of the known corrosion issues associated with chloride-based electrolytes. Most metals tend to corrode in aqueous chloride environments—especially when anodic potentials are applied. Since anodic potentials would necessarily be applied to metal current collectors during cell charging, a highly corrosion resistant metal current collector must be used. Even nickel, stainless steel, gold, Monel or A20, usually known for their corrosion resistant properties, are unsuitable since they typically corrode in aqueous chloride electrolytes when they are held at anodic potentials.

Titanium metal, however, has superior oxidation resistance (even in aqueous chloride environments) under anodic potentials. Titanium, a thermodynamically reactive metal, may spontaneously form (owing to its extremely high affinity for oxygen) a continuous, strongly adherent, oxide film $TiO_2$ on its surface in the presence of air or moisture. This passive $TiO_2$ film on titanium surfaces is believed to be responsible for the excellent corrosion resistance of titanium.

Although titanium may be described as a preferable metal current collector in various embodiments of the invention herein, characteristics, features, or components that may utilize different materials for current collectors and vice-a-versa may also be applied. For example, suitable current collectors may include other metals (such as iridium), metal alloys, carbon, graphite, silicon, silicon carbide, other metal carbides or glassy carbon.

The current collector or substrate may have numerous forms, including solid or porous substrates. For example, the current collector may include pressed or sintered powder material, may be coated, or be made of any other porous material.

In some embodiments, rechargeable zinc air cells or other metal air cells may be provided. The cell may be constructed with an expanded titanium screen as a current collector in air electrodes. As previously discussed, a current collector may have one or more different forms, and need not be limited to a screen. Specifically, porous carbon air electrodes may be constructed by coating porous carbon and suitable oxygen reduction catalysts on expanded metal titanium screens. Alternatively, current collectors could be perforated titanium metal plates, woven fabrics made from titanium metal wire, or even material made from pressed and/or sintered titanium powder or pressed and/or sintered titanium oxides. Plating, cladding or implanting titanium or other suitable metals on/over a variety of electrical conductors may also be effective as current collectors. Other materials having similar forms may be used.

A suitable current collector or electrode may consist of an outer titanium layer to provide corrosion protection while an underlying electrical conductor provides good electrical conductivity. Under anodic potentials, even in the presence of chloride ions (or other corrosive species) in aqueous solutions, using other suitable metals or metal oxides as coatings or outer layer covering could provide corrosion protection on exposed surfaces. Candidate metals may include but are not limited to Ti, Zr, Nb, carbon nanotubes (CNT), $Ti_xO_{zx-1}$, titanates, iridium, ruthenium, and rhodium as well as their oxides, nitrides and carbides. Due to the high cost of these some of the aforementioned, corrosion resistant materials, very thin plate of these materials may be provided over less expensive and better conducting materials such as copper, aluminum, or nickel. Other possible useful materials as an electrode or coating may include silicon, silicon carbide or $Ti_4O_7$ or other conductive metal or mixed metal oxides. In the absence of chloride (halides), an even wider range of metals and alloys may be suitable. These may include, but are not limited to, metals and alloys such as nickel, lead, Monel, Hastelloy, Chlorimet, A20 and most nickel, lead or stainless steel alloys.

In some embodiments, a bifunctional air electrode for a metal-air battery or cell may be provided in accordance with an aspect of the invention. The bifunctional air electrode may include at least one current collector, which may have a corrosion-resistant outer layer and a conductive inner layer. The bifunctional air electrode may also have an air permeable hydrophobic catalytic membrane. In some embodiments, the corrosion-resistant outer layer has a greater corrosion-resistance than the conductive inner layer and/or the corrosion resistant inner layer has a higher level of electrical conductivity than the corrosion resistant outer layer.

Figure 2A:
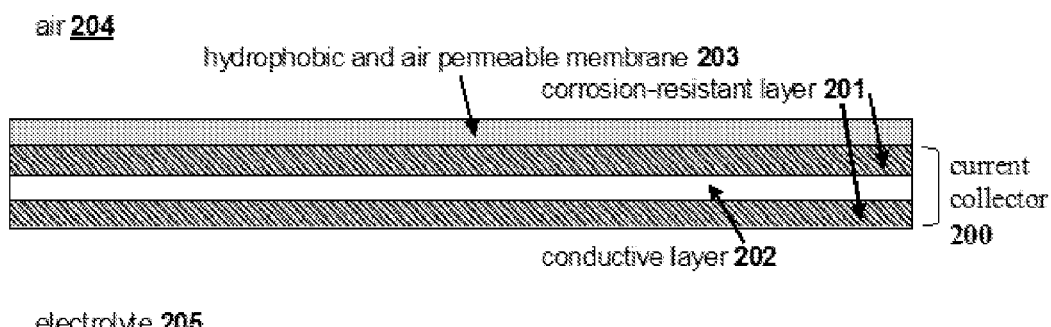
FIG. 2A provides a side view of another example of an air electrode.

FIG. 2A provides a side view of another example of an air electrode. Optionally, the air electrode may be a bifunctional air electrode. During electrical charging under anodic potentials, oxygen evolution may be favored.

A current collector 200 may include a corrosion-resistant outer layer 201 and a conductive inner layer 202. The corrosion-resistant outer layer may be more resistant to corrosion than the underlying inner layer. In some embodiments, the corrosion-resistant outer layer may only be slightly more resistant to corrosion than the inner conductive material. For example, the corrosion-resistant outer layer may be about 1% or more, 5% or more, 10% or more, 15% or more, 20% or more, 30% or more, or 50% or more corrosion-resistant. In other cases, the outer layer may be substantially more resistant to corrosion than the inner conductive material. The inner layer may be more electrically conductive than the corrosion-resistant outer layer. In some embodiments, the conductive layer may be about 5% or more, 10% or more, 15% or more, 20% or more, 30% or more, 50% or more, or 75% or more, or 100% or more electrically conductive than the corrosion-resistant layer. In one example, if the outer layer is formed of titanium, the inner layer may be more electrically conductive than titanium. In some embodiments, the inner layer and/or the outer layer may have conductivities greater than or equal to about $1\times10^5$ S/m, $5\times10^5$ S/m, $1\times10^6$ S/m, $5\times10^6$ S/m, $1\times10^7$ S/m, $3\times10^7$ S/m, $4\times10^7$ S/m, or $5\times10^7$ S/m. In some embodiments, the same material may be used for the inner layer and outer layer. In some embodiments, the materials provided for the inner and outer layer may have the same or varying forms (e.g., solid vs. porous).

For example, an inner and outer layer need not be provided, and only one layer may be provided. In some embodiments, the corrosion-resistant outer layers may be provided on both sides of the conductive layer, thereby sandwiching the conductive layer between them. In some embodiments, the conductive layer may be coated by the corrosion-resistant outer layers on one or both sides. In other embodiments, the corrosion-resistant layer may be provided on only one side of the conductive layer, such as the air-facing side or the electrolyte-facing side of the current collector. In some embodiments, only portions of a side may include the corrosion-resistant layer. In other embodiments, additional layers may be provided, having varying degrees of electrical conductivity and corrosion-resistance. Similarly, the materials may also have varying degrees of cost.

In some embodiments, a corrosion-resistant outer layer may have a lesser thickness than a conductive inner layer. In another embodiment, the outer layer may have a greater than or equal thickness to the conductive inner layer. The ratios of thickness for outer layer to inner layer may include, but is not limited to, about 20:1, 15:1, 12:1, 10:1, 8:1, 6:1, 5:1, 4:1, 3:1, 2:1, 1.5:1, 1:1, 1:1.5, 1:2, 1:3, 1:4, 1:5, 1:6, 1:8, 1:10, 1:12; 1:15, or 1:20.

An air electrode may also include a membrane on one or more sides of a current collector 200. For example, a hydrophobic and air permeable membrane 203 may be provided. The membrane may be a catalytic membrane. In some embodiments, a hydrophobic membrane may be provided on a current collector on a side that faces air 204. Alternatively, a suitable membrane may be provided on a current collector side that faces an electrolyte 205. The hydrophobic membrane may contact a corrosion-resistant layer 201 of the current collector. Alternatively, it may contact a conductive layer of the current collector.

In alternate embodiments, a hydrophilic membrane may also be provided. The hydrophilic membrane may or may not be catalytically active. In some embodiments, the hydrophilic membrane may be provided on a current collector on a side that faces an electrolyte. Alternatively, it may be provided on a current collector side that faces air. The hydrophilic membrane may contact a corrosion-resistant layer of the current collector. Alternatively, it may contact a conductive layer.

In some embodiments, a catalytic membrane may be provided. The catalytic membrane may contain a catalyst selected from the group consisting of: metals, salts, and compounds containing one or more of the following: Mn, Co, Ag, Pt, Mo, Pd, Fe, Ni, Cu, V, Cr or suitable mixtures thereof. The catalytic membrane itself may act as a catalyst to affect the reduction of oxygen and/or the generation of oxygen.

An air electrode may optionally use porous silicone rubber as a hydrophobic, oxygen permeable membrane. This could include other oxygen permeable membranes such as dimethyl silicone, fluorosilicone, nitrile silicone, natural rubber, ethyl cellulose, and low-density polyethylene.

A conductive inner layer may include copper, aluminum, nickel, silver, brass, bronze, tin, lead, iron, gold, iridium, ruthenium, rhodium, rhenium, or alloys thereof in some embodiments of the invention. In some embodiments, the conductive inner layer may comprise titanates having the general formula $M'M''TiO_x$ where M' and M'' refer to a metal and x is the suitable subscript of the titanate. As an example, in some embodiments, the conductive titanates may comprise at least one of the following: $LiVTiO_4$, $LiVTiO_3$, or $LaTiO_3$. In some embodiments, a bifunctional electrode may include a conductive polymer inner layer.

In some embodiments, a corrosion-resistant layer may include a titanium metal or its alloys. The corrosion-resistant layer may also include zirconium metal, rhenium metal, or their alloys. The corrosion-resistant layer may also include carbon nanotubes, $Ti_xO_{zx-1}$, titanates, iridium, rhenium, or other corrosion resistant metals as a powder or particle form.

In some embodiments, the corrosion-resistant layer may comprise a powder coating of a corrosion resistant material in a coating material that coats the conductive inner layer. The coating material may be a conductive plastic or epoxy. In some embodiments, a bifunctional electrode may include a conductive polymer corrosion-resistant layer. In some embodiments, a carbon-based corrosion-resistant layer may be provided, such as a graphite cloth or some other form of porous graphite. In some embodiments, a carbon-based porous substrate may be provided as a current collector as an alternative to titanium or treated titanium.

In some embodiments, a bifunctional air electrode may have a porous carbon-based coating on its current collector. In some embodiments, a bifunctional air electrode may be a carbon-based bifunctional electrode that is capable of both reducing oxygen during cell discharge and oxidizing water to form oxygen gas during cell charge.

An Air electrode may contain a formed oxide on the current collector. This oxide may act as a corrosion-resistant layer. In some embodiments, the oxide may have a dual function of (1) acting as a protective coating, and (2) acting as a catalyst. In some embodiments, the oxides may be (La, Mn, or Co)$O_x$.

In some embodiments, a catalytic membrane may be provided. The catalytic membrane may include a catalyst selected from the group consisting of: metal, salts, or compounds containing one or more of the following: Mn, Co, Ag, Ni, Fe, Cu, V, Cr, Pt, Mo, Pd, or mixtures thereof. The catalytic membrane may act as a catalyst to affect the reduction of oxygen or the generation of oxygen. The catalytic membrane may include porous, air and oxygen permeable, silicone rubber. The catalytic membrane may be air permeable and may be hydrophobic. The membrane may include one or more of the following: demithyl silicone, fluorosilicone, nitrile silicone, natural rubber, ethyl cellulose, or low-density polyethylene. During electrical charging under anodic potentials, oxygen evolution may be favored.

In some embodiments, fullerenes may be electrochemically deposited from an aqueous or non-aqueous solvent on the current collector. Alternatively, carbon nanotubes (CNT) may be deposited onto the current collector. In some instances, a glassy carbon may be coated on a substrate with a resin known to create glassy carbon when pyrolyzed. Pyrolysis at approximately 1,000 C in an inert atmosphere or vacuum may occur. Typical resins include but are not limited to phenolic types, furfaral types, polyvinylchloride types, polyester types, to name a few.

Figure 2B:
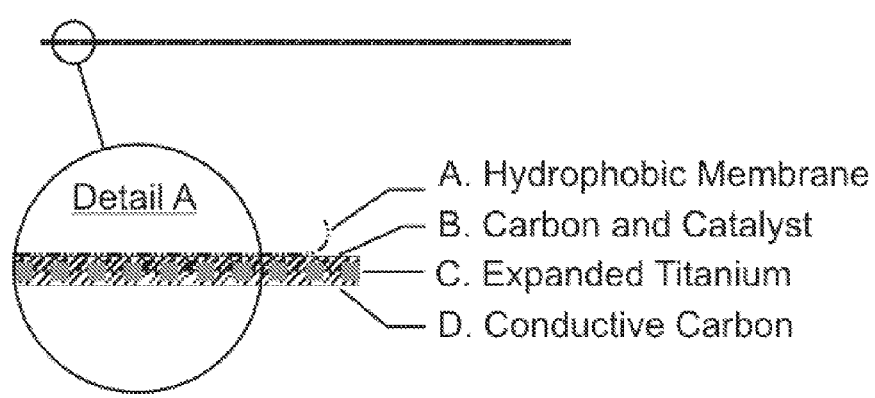
FIG. 2B show a side view of an air electrode.

FIG. 2B shows a side view of an air electrode. In accordance with an embodiment of the invention, the air electrode may have a hydrophobic membrane A, carbon and catalyst B, expanded titanium C, and conductive carbon D.

In some embodiments, the hydrophobic membrane may be provided on an air facing side of the air electrode. The carbon and catalyst may also be provided on the air facing side of the electrode. In some embodiments, the conductive carbon may be provided on an electrolyte facing side of the electrode. Expanded titanium may be provided between the carbon and catalyst, and the conductive carbon.

Figure 3:
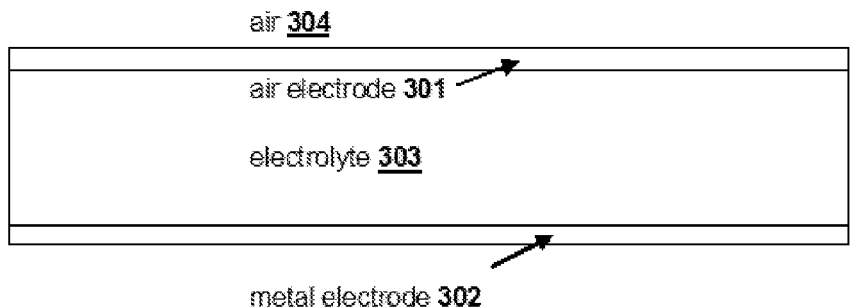
FIG. 3 shows an example of a portion of a battery cell.

FIG. 3 shows an example of a portion of an individual cell of a multi-cell battery. In some embodiments, this cell may be one part of a metal-air battery, such as a zinc-air battery, aluminum-air battery, magnesium-air battery, iron-air battery, lithium-air battery, sodium-air battery, titanium-air battery, titanium metal hydride air battery, rare earth hydride-air battery or beryllium-air battery. The battery may be rechargeable. Each individual cell may include an air electrode 301 and a metal electrode 302. In some embodiments, an electrolyte 303 may be provided between the air electrode and the metal electrode. In some embodiments, the electrolyte may be aqueous. The electrolyte may contact the metal electrode and/or the air electrode. In some embodiments, air 304, which may include oxygen gas, or air enriched or depleted in oxygen may be provided along the air electrode. In some embodiments, the air may contact the air electrode directly.

In some embodiments, a metal-air battery cell may include a metal electrode, a bifunctional air electrode, and aqueous electrolyte between the metal electrode and bifunctional air electrode. In some embodiments, the bifunctional air electrode has a titanium current collector and a titanium suboxide layer formed on the titanium current collector. In some embodiments, the current collector for the bifunctional air electrode may be made of metals, non-metals, conducting polymers, conducting ceramics, or any other coated electrical conductor. Current collectors may have a corrosion-resistant outer layer and a conductive inner layer.

In some embodiments, a battery cell may have a first electrode and a second electrode, and an aqueous electrolyte between the first electrode and the second electrode. The first electrode may have an electrolyte-facing side and a non electrolyte-facing side. The non electrolyte-facing side may be an air facing side. In some embodiments, the electrolyte-facing side may be hydrophilic and/or the air-facing side may be hydrophobic, or vice versa.

The first electrode may include a current collector that has a porous substrate and a non-porous backing on the electrolyte-facing side. In some embodiments, the porous material may be a carbon material on a substrate, such as graphite. In other embodiments, the porous material may be a porous titanium material, such as a porous titanium substrate, or any other material discussed elsewhere herein. In some embodiments, the substrate may be or have a conductive inner layer. The current collector may include a corrosion-resistant outer layer.

In some embodiments, the first electrode may be an air electrode and the second electrode may be a metal electrode. The second electrode may have a current collector including a metal. In some embodiments, the metal or other material for the current collector may be any conductor mentioned above.

In some embodiments, the air electrode may be provided over the metal electrode when a cell is in an upright configuration. Air may be provided over the air electrode, and electrolyte may be provided beneath the air electrode and above the metal electrode. Alternatively, different configurations, such as a reverse configuration, may be provided. An air electrode may be provided between air and electrolyte. The metal electrode may optionally be positioned between electrolyte and air.

A cell may include an air electrode and a metal electrode. In some embodiments, during cell discharge, the air electrode may function as a cathode and the metal electrode may function as an anode. During cell charge, the air electrode functions as an anode and the metal electrode functions as a cathode. In some instances, an air electrode may be carbon based. The air electrode may have a specially treated surface (or the bulk immediately near the surface) to deliberately make the air facing side of the air electrode hydrophobic. The air electrode may have a specially treated surface (or the bulk immediately near the surface) to deliberately make the electrolyte-facing side of the air electrode hydrophilic. In some embodiments, the air electrode may have a specially treated surface to deliberately make the air facing side (or the bulk immediately near the surface) of the air electrode hydrophobic and to simultaneously make the electrolyte facing side (or the bulk immediately near the surface) of the air electrode hydrophilic.

Figure 4:
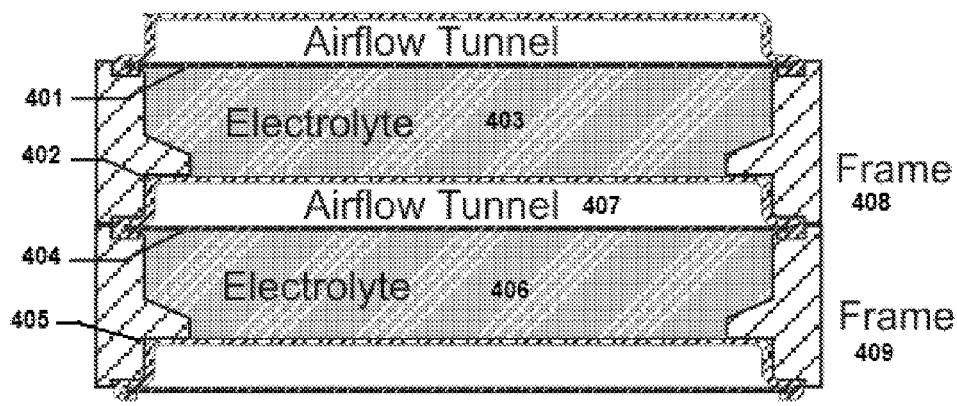
FIG. 4 shows an example of a plurality of battery cells.

FIG. 4 shows an example of a number of individual cells. For example, a first cell may have a first electrode 401 and a second electrode 402. An electrolyte 403 may be provided between the first and second electrodes. A second cell may have a third electrode 404 and a fourth electrode 405. An electrolyte 406 may be provided between the third and fourth electrodes. An airflow tunnel 407 may be provided between the first and second cells. In some embodiments, air from the air flow tunnel may contact an air-facing side of the second electrode and the third electrode. In some embodiments, one or more frame 408, 409 are provided to support the cells. For example, a first cell may have a first frame 408 to keep the first and second electrodes separated at a fixed distance, while the second cell may have a second frame 409 to keep the third and fourth electrodes separated at a fixed distance.

In other embodiments, the second electrode 402 from the first cell may be electrically connected to the third electrode 404 from the second cell. In some embodiments, the second electrode may be directly contacting the third electrode. In some embodiments, one or more portion of the second electrode and or third electrode may be crimped around one another, folded over one another, bent over one another, brazed to one another, welded to one another, pressed against one another, or soldered to one another. A space may be provided between the second and third electrode through which air may flow. In some embodiments, the second and third electrodes may form a continuous piece with an air tunnel provided between the second and third electrode. In some embodiments, the second and third air electrode may form a continuous piece that may be formed of a single integral piece. Alternatively, the second and third electrode may form a continuous piece out of a plurality of pieces that may be electrically and/or physically connected to one another.

In some embodiments, the third electrode may have a current collector including a porous graphite substrate, or a porous titanium substrate, or any other material as described elsewhere herein. In some embodiments, the substrate can potentially be extended and backed with a non-porous backing. A non-porous backing may block electrolyte flow. The same or similar material may be used for the second and fourth electrode. In some embodiments, the second and third electrodes may be fabricated as a single continuous wrapped piece that may have an air tunnel within.

In some embodiments, the first electrode and the third electrode may be air electrodes. The second electrode and fourth electrode may be metal electrodes. Such electrodes may have a particular configuration as discussed elsewhere herein or any suitable configuration known in the art.

The first and second cell may form a battery stack. In some embodiments, the second cell may be provided beneath the first cell when the stack is in an upright configuration, or vice versa. In some embodiments, the air electrode of a cell may be provided above the metal electrode of the cell when the cells are in an upright configuration, or vice versa. Air tunnels may be provided between cells of a stack. In a vertical configuration, individual cells are vertically aligned. In other embodiments, one or more cells may be adjacent to one another.

Any number of cells may be provided in a battery stack. For example, one, two, three, four, five six, seven, eight, nine, ten, or more cells may be provided in a battery stack. In some embodiments 10 or more, 20 or more, 30 or more, 40 or more, 50 or more, 60 or more, 70 or more, 80 or more, 90 or more, 100 or more, 150 or more, 200 or more, 250 or more, or 300 or more batteries may be provided in a stack. Each cell in a metal-air battery stack could include an air electrode and a metal electrode. Electrolyte may be provided between each air electrode and metal electrode of a cell of the stack. In some embodiments, air may be provided between each air electrode and metal electrode between the cells of the stack. Such a design could be compatible with the type of cells described in patent application Ser. No. 12/841,115 filed on Jul. 21, 2010, which is hereby incorporated by reference in its entirety.

Treating Oxide Layers on Titanium to Make the Oxide More Electrically Conductive During our cell testing, a significant cell resistance was traced to the naturally occurring ubiquitous and highly insulating titanium dioxide, $TiO_2$, film that spontaneously forms on metallic titanium in air. While $TiO_2$ is responsible for the very favorable corrosion resistance of titanium, this oxide is quite electrically resistive.

A number of ways may be provided to maintain the desired corrosion resistance of $TiO_2$ while modifying this oxide to make it considerably more electrically conducting. One of the procedures may involve deliberately forming titanium suboxides instead of TiO2. Suboxides include titanium oxides that, instead of having Ti:O ratios of 1:2, as in $TiO_2$, instead have a lower oxide content and have the general formula $Ti_xO_{2x-1}$ where x can have values of 3, 4, 5 . . . e.g. $Ti_3O_5$, $Ti_4O_7$ etc. (sometimes called Magneli phases). Lowering the oxygen content in $TiO_2$ to make it into TiO or even $Ti_2O$ may also be possible and suitable. These reduced oxides listed above are expected to provide both excellent corrosion resistance as well as improved electrical conductivity.

One quick indication if any changes in oxide composition have occurred is to visually observe the color of the titanium surface oxide. Titanium suboxides (depending on the particular oxide) tend to have a blue color. The intensity of the blue coating is a general indication of the oxide composition. The blue titanium oxide may have desired properties, which may include corrosion resistance and higher electrical conductivity. There are a number of possible ways to modify the oxide layer on titanium metal. Examples of ways that may help prepare the preferable, more conducting titanium suboxides on titanium surfaces include:

a. Chemical reduction. Chemically reducing $TiO_2$ oxide by immersing titanium and its oxide in aqueous or nonaqueous solutions containing a suitable chemical reducing reagent. In some embodiments, suitable reducing agents may include $NaBH_4$ or hydrazine b. Reducing gas. Treating titanium metal (e.g., that which has an oxide of $TiO_2$) with one or more well known reducing gases such as CO gas or other gases or atmospheres noted below and herein at elevated temperatures (generally between 500-1000 C) to convert naturally occurring $TiO_2$ coating to a sub oxide, such as $Ti_4O_7$. This may be evidenced by the titanium metal changing to a blue color after high temperature heat treatment with CO gas or other reducing gases or atmospheres such as those noted below and herein. Hydrogen gas may also accomplish oxide reduction. However, hydrogen gas may enter the Ti lattice creating a very brittle hydride underneath, thus appropriate care in titanium processing with hydrogen is required. In addition to CO, other reducing gases such as $CH_4$, $N_2$, $NH_3$ or argon, a mixture of these gases, or even a vacuum may also be suitable. Additionally, an atmosphere of a reducing metal vapor such as alkali metals (sodium, potassium, lithium, Rb, Cs) or magnesium vapor may also be used to make a reduced conductive titanium oxide layer.

c. Electron beams. Bombarding TiO2 oxide layers on Titanium with electron beams may form reduced, electrically conducting suboxides.

d. Gas plasma. Titanium metal (and its surface oxide) may be exposed to a reactive, ambient temperature microwave (e.g., within a microwave chamber) or RF induced gas plasma in the presence of suitable reducing gases including (but not limited to) CO, $CH_4$, $N_2$, and $NH_3$ or mixtures of these gases, or within a vacuum.

e. Electrochemical reduction. In some embodiments, techniques may include electrochemical reduction of $TiO_2$ oxide layers on titanium by applying sufficiently cathodic potentials to titanium metal (which may be coated with its naturally formed oxide) while titanium metal and its surface oxide are immersed in either aqueous or non aqueous solutions with appropriate electrolyte salts. In some examples, the cathodic potentials may be applied to a titanium current collector while the titanium current collector and its coating of titanium dioxide film are immersed.

f. Initial oxide layer. A slight modification of the electrochemical reduction concept could involve first forming a thick oxide layer of $TiO_2$ (by any one of a number of methods described below) on titanium. The next step could be to then deliberately reduce the oxygen content of this thicker formed $TiO_2$ oxide layer. This procedure may result in a thick oxide layer that may be nevertheless electrically conducting and chemically protective in a corrosive environment. Thick $TiO_2$ layers may be purposely formed either via electrochemical means (holding titanium at suitable anodic potentials in appropriate aqueous or non aqueous electrolytes), high temperature oxidation in the presence of oxygen (or other suitable oxidizing agents), or by allowing titanium metal to remain exposed to moist air for extended time periods.

g. Doping films. One technique may include doping $TiO_2$ films with other selected metal ions. This may be accomplished by applying suitable anodic potentials to cleaned titanium metal in an aqueous or non-aqueous electrolyte that also contains soluble salts of iridium, or manganese ions. As $TiO_2$ layers are formed, $IrO_2$ or $MnO_2$ may simultaneously also be formed and deposited within this $TiO_2$ lattice. This inclusion of other metal oxides could still provide corrosion protection to underlying titanium metal while making the formed $TiO_2$ oxide electrically conducting. In some examples, dioxide film may be doped with iridium or manganese ions through electrochemical means or ion implantation.

h. Gamma Ray Irradiation. $TiO_2$ films on titanium may be made more electrically conducting while still maintaining their corrosion protection to underlying material by exposing $TiO_2$ to gamma rays. This is expected to introduce defect centers within the $TiO_2$ lattice and provide for better electrical conductivity.

Figure 5A:
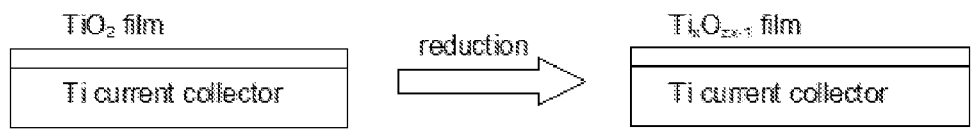
FIG. 5A illustrates a process where a film on a current collector is reduced.

FIG. 5A illustrates a process where a film on a current collector is reduced. A titanium current collector may be provided. The titanium current collector may have a film. In some embodiments, the film may be provided on one side of the current collector. In some embodiments, the film may be provided on an air-facing side of a current collector or an electrolyte-facing side of a current collector. The film may include $TiO_2$. In some embodiments, reduction of $TiO_2$ may occur, so that the titanium current collector may have a titanium suboxide film. The titanium dioxide may be reduced to a more conductive titanium suboxide.

In some embodiments, the titanium suboxide may be of the form $Ti_xO_{zx-1}$. In some embodiments, z=2 so that the titanium suboxide may be of the form $Ti_xO_{2x-1}$. In some embodiments, x may be >1. For example, x may have a value greater than or equal to 1, 2, 3, 4, 5, 6, 7, 8, 9, 10, 11, 12, 13, 14, 15, or more. For example, suitable titanium suboxides may include $Ti_2O_3$, $Ti_3O_5$, $Ti_4O_7$, or $Ti_5O_9$. In other embodiments, z may have other values of 2 or greater. For example, z may have a value greater than or equal to 2, 3, 4, 5, 6, 7, 8, 9, 10, 11, 12, or more.

Reduction of TiO2 to titanium suboxides may use any of the techniques described elsewhere herein as well as any other techniques known in the art. Any discussion of reducing titanium dioxides to titanium suboxides may also be applied to other metal oxides being reduced to various other metal suboxides. Other metal suboxides may have a similar formula. For example, a metal suboxide of $(Metal)_xO_{zx-1}$ may be formed where the term (Metal) refers to any suitable metal, and z and x are any positive numerical value, including those mentioned previously.

Figure 5B:
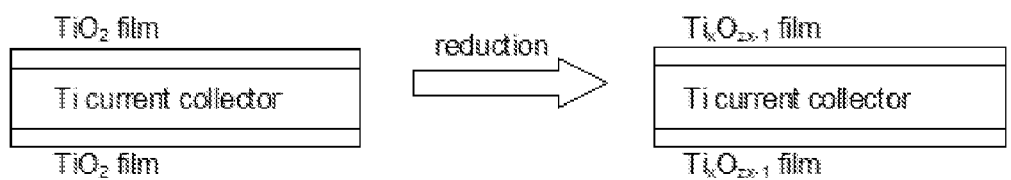
FIG. 5B provides another example of where films on current collectors are reduced.

FIG. 5B provides another example of where an existing film on a current collector is reduced. A titanium current collector may have an oxide film on both sides. In some embodiments, a suitable film may be provided on both the air-facing side and the electrolyte-facing side of a current collector. The film may include $TiO_2$. In some embodiments, reduction may occur, so that the titanium current collector may have a titanium suboxide film. Titanium dioxide may be reduced to a titanium suboxide. In some embodiments, titanium suboxide may include any of those species previously described. In some embodiments, films on both sides of a current collector may be reduced to the same titanium suboxide. Alternatively, they may be reduced to different titanium suboxide. Any discussion of titanium and titanium oxides and suboxides may also be applied to other metals or materials and their oxides or suboxides.

In some embodiments, films may be evenly formed over one or more surfaces of the current collector, and may cover all or part of the surface of the current collector. Alternatively, regions or parts of the current collector may develop films, or films may have varying thicknesses over the area of the current collector. As previously mentioned, the films may be reduced to form a desired suboxide, such as a titanium suboxide. Such suboxides may have a desired corrosion-resistant property while being more electrically conductive than $TiO_2$. In some embodiments, the suboxide may have an electrical conductivity of $10^3$ S/m or greater, $10^4$ S/m or greater, $10^5$ S/m or greater, $10^6$ S/m or greater, $10^7$ S/m or greater, $5\times10^7$ S/m or greater, or any other value.

Titanium suboxide may be formed on a titanium outer layer of a current collector. For example, the titanium suboxide may be formed on a corrosion-resistant outer layer of the current collector. Titanium suboxide has the general formula of $Ti_xO_{zx-1}$, as previously described.

Advantages may be provided by a reduced titanium dioxide suboxide over commercial titanium suboxides, such as Ebonex. A reduced titanium dioxide may be formed by the methods described herein.

Titanium dioxide, $TiO_2$, a reducible metal oxide, may exist in a variety of oxidation states and crystal structures. It may be used in many technical areas where high temperature reduction and oxidation processes play a role, for example as promoter in heterogeneous catalysis, in protective coatings, and as active material in gas sensors. Heating bulk single crystals in vacuum or in a reducing atmosphere may lead to visible color changes from transparent to light blue and, eventually, dark blue. While stoichiometric $TiO_2$ is a wide gap semiconductor and has poor electrical conductivity, reduced $TiO_2$ crystals exhibit enough n-type doping to exhibit good electrical conductivity.

Catalyst supports based on nonstoichiometric mixtures of several titanium oxide phases, mainly $Ti_4O_7$ and $Ti_5O_9$, is known by its trade name Ebonex. Ebonex is electrochemically stable, and has higher electrical conductivity than $TiO_2$. However, this ceramic material lacks the structural strength and flexibility of a metal. By using reduction methods according to embodiments of the invention for creating $Ti_4O_7$ and $Ti_5O_9$ suboxides (or other titanium-based suboxides) on titanium metal surfaces, conductivity and corrosion resistance advantages of a suboxide will be combined with advantages of the underlying titanium metal, such as strength, flexibility, formability (e.g., for bending and cutting), ability to attach to other materials, durability, potential cost savings in processing and other advantages that a metal may have over a more brittle or fragile ceramic material such as Ebonex. In addition, underlying metal such as Titanium will have greater electrical conductivity as compared to the suboxide and thus the overall material could be thinner while having comparable or better total conductivity with underlying titanium or other metal.

The use of titanium metal as an underlying substrate has distinct advantages over the use of traditional pure $Ti_4O_7$. One is that titanium is a better conductor by a factor of 3 than $Ti_4O_7$ so a current collector made with titanium will have less resistance and can be made thinner. Another advantage is that titanium has metallic properties and is stronger and easier to work with than $Ti_4O_7$ which needs to be handled the same as a ceramic. Historically $Ti_4O_7$ has been made into shapes by using ceramic processing techniques such as firing $TiO_2$ to form the shape and then reducing the $TiO_2$ with hydrogen to form the $Ti_4O_7$ which is somewhat limiting in the types of electrodes that can be made. This is required since if the $Ti_4O_7$ is made as a powder first it can mot be easily fabricated into electrodes. With the technique described herein it is only required to work with metal in any form such as sheet, foil, powder, wire, and no need to use more difficult or expensive techniques.

This will allow performance improvements not only in electrode current collector applications, but also in catalysis and photooxidation applications where Ebonex is currently used (e.g. in chloralkeli production and other industrial and electrolytic processes). Thus, it may be beneficial to use the methods for reducing titanium dioxide to a titanium suboxide as discussed elsewhere herein. Titanium suboxides, reduced from a titanium dioxide and including those formed by a method described therein, may be advantageously included in electrode current collector applications, catalysts, photooxidation applications, or other applications.

As Ebonex is a ceramic made only of formed or sintered $Ti_4O_7$ and $Ti_5O_9$ suboxides (or other titanium-based suboxides), it is less flexible, less conductive and therefore generally thicker, less durable, and has less ability to be formed or attached to other materials.

Air Electrodes Constructed with Porous, Coated Hydrophilic and/or Hydrophobic Coatings A porous carbon-based air electrode may function as a sheet-like interface between ambient air (which may supply gaseous oxygen reactant to the electrode) and a conductive liquid electrolyte. Any discussion herein may also apply to any type of air electrode, which may include air electrodes formed from other materials discussed elsewhere herein. The air facing surface of air electrodes may be deliberately designed to be water repelling—hydrophobic. This may prevent electrolyte from seeping through the porous structure and forming a liquid layer near the electrode surface. Such a buildup of electrolyte could be detrimental to electrode performance since oxygen permeability through liquids is generally low. Traditionally, porous, hydrophobic, Teflon-like polymer such as Goretex may be laminated onto the air facing side of the air electrode.

In some embodiments, instead of laminating or pasting a freestanding, porous membrane onto the air electrode surface, it may be possible to spray or deposit a thin layer of an aqueous or non-aqueous solution of hydrophobic polymer on the electrode surface. Once dried, this hydrophobic polymer can impart hydrophobicity to the air electrode surface. Similarly, an aqueous or non-aqueous solution of a hydrophilic polymer may be deposited on the electrolyte facing side. Thus, depending on which electrode surface is to be treated, either a hydrophobic or hydrophilic polymer may be chosen.

As an alternative to spraying, an appropriate plastic powder may be mixed into the carbon paste and allowed to harden as it is dried. One example of hydrophilic plastics is the type of polymer used to make contact lenses. This plastic could either be mixed in with electrically conductive carbon or sprayed onto the bottom of the air electrode to help wick liquid electrolyte into the carbon. This could enhance both the strength and performance of carbon air electrodes.

Using Other Electrically Conducting Materials to Make Porous Electrodes

A porous air electrode may comprise any of the following (alone, together, or in combination): powdered, electrically conducting powders, nanomaterials (e.g. carbon nanotubes (CNT), nanometals, nanopolymers), conductive polymers, various powders (including metals, sintered metals, metal oxides, carbon blacks, and/or graphite), or any other coarse or fine powdered material that may be pressed, sandwiched, adhered, or sintered together (with suitable catalysts) to make a structurally sound, electrically conductive, porous structure. This may include pressing or sintering of any conductive material such as carbon black, activated carbon or graphite powder into an already formed, substrate made of either sintered metal foam, pressed metal powder, pressed metal oxide powder, porous conducting polymer, ceramic, or any other porous, conducting material. For example, carbon black (or other suitable conductors) may be pressed into foamed metal, expanded metals, or pressed, sintered metal powders. Additionally, suitable catalyst materials may be added to the carbon prior to pressing into the metal.

1. Post Fabrication Treatment of Assembled Air Electrodes.

Figure 6:
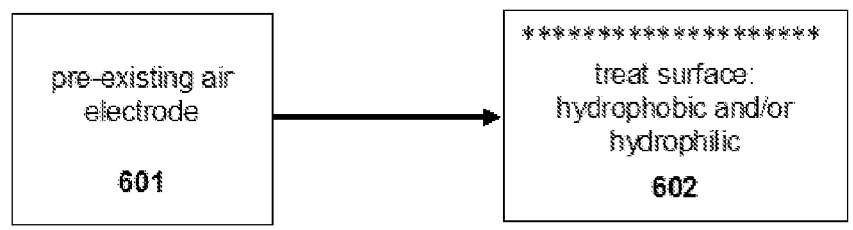
FIG. 6 shows an example of a process where prepared air electrodes may be subsequently treated.

FIG. 6 shows an example of a process where a pre-existing air electrode may be treated. One easy-to-implement process involves taking an already fabricated air electrode and then modifying it so that either one or both faces are deliberately made either hydrophobic or hydrophilic. For instance, a pre-existing air electrode may be provided 601. In some embodiments, the pre-existing air electrode may be a traditional air electrode as known in the art. In other embodiments, the pre-existing air electrode may be an air electrode as described elsewhere herein. The surface of the pre-existing air electrode may be treated 602. In some embodiments, the surface may be treated to become hydrophobic or hydrophilic.

An electrode may have a specially treated surface or near surface such that the electrolyte-facing side is hydrophilic. The electrode may have a specially treated surface or near surface such that the air-facing side of the electrode is hydrophobic.

The already fabricated air electrode may or may not already have a hydrophobic or hydrophilic surface. One advantage of post fabrication treatment to make the air-facing surface hydrophobic is the elimination of costly, hydrophobic, air permeable polymer film normally glued or laminated on the air facing side. This may reduce costs, improve performance and improve durability. Making one side of the electrode hydrophobic may be accomplished by a number of possible treatments including (but not limited to):

a. Chemical modification. An air electrode may be deposited or coated with suitable hydrophobic or hydrophilic polymers. Examples of such hydrophilic polymers may include but are not limited to polymer systems based on acrylics, amines, styrenes, vinyl acids, vinyl alcohols or any combination of these. Examples of hydrophobic polymers may include but are not limited to fluoropolymers, and ether based polymers or any combination of these.

b. Gas plasma treatment. Gas plasma treatment is a well known and widely used procedure for rapidly modifying water wettability of a number of different surfaces at room temperature. By proper selection of reacting gases, this easy to apply treatment may be used to make non-water wettable (hydrophobic, Teflon-like) surfaces more water wettable (hydrophilic). This technique may also be used to make hydrophilic surfaces more hydrophobic. Proper selection of reactive gas used in gas plasma treatment of air electrodes, exposure times, and plasma power levels, (and treating only one side of the flat air electrode at a time) may allow for deliberately making one side of the electrode hydrophobic while making the opposite side hydrophilic. In alternative embodiments of the invention, both sides of the electrode may be made hydrophilic or hydrophobic, or portions of sides may be hydrophilic or hydrophobic.

A fully fabricated air electrode structure may be placed in a plasma reactor and exposed to a selected low pressure gas or gas mixture in the presence of RF or microwave energy. This energy may cause the gas inside the chamber to ionize. Depending on the particular gas selected, ion fragments may either oxidize or reduce surface groups on air electrode surfaces to make surfaces either hydrophobic or hydrophilic. Already assembled electrodes may be treated so that either one face becomes hydrophobic and the other face hydrophilic, both faces become hydrophilic, or both faces become hydrophobic. In some embodiments, a surface, or portions of one or more surface may be untreated.

c. Plasma polymerization. Plasma polymerization of a thin layer of selected water repelling polymers on one or more air electrode surfaces may make the surfaces hydrophobic yet air permeable. Some examples of such water repelling polymers may include hexamethyldisilazane, polystyrene or other suitable polymers.

d. Electrochemical methods. Electrochemical methods may involve oxidizing or reducing surface functionalities on one or more air electrode surfaces to make these surfaces either hydrophobic or hydrophilic.

e. Chlorosilane gas. Chlorosilane gas may be used as a reactive gas to create a thin, porous, (air permeable), hydrophobic, surface on air electrodes. These thin layers would not impede oxygen penetration rates but still could provide a hydrophobic barrier f. Surface coating. Coating air electrode surfaces with a very thin, oxygen permeable barrier of water-repelling Paraffin wax, polyethylene, PTFE, or Polyvinylidene fluoride may also be used to provide desired surface properties. Also, coating air electrode surfaces with a thin film of water-repelling, oxygen permeable silicone rubbers may also provide desired surface properties. For example, hydrophobic materials may be coated on one or more air electrode surfaces to cause the air electrode surfaces to be hydrophobic.

2. Using New Electrode Catalysts.

Various catalysts may be used to catalyze oxygen reduction and oxygen generation reaction (via oxidation of aqueous electrolyte). These may include but are not limited to: nanomaterials, metals (such as Mo, Co, Pt, Au), or selected metal oxides (such as $MnO_2$, $Ti_4O_7$, $IrO_2$).

3. Plasma Polymerization or Plasma Treatment on Carbon Powder.

Carbon black used in fabricating air electrodes may be deliberately made hydrophobic prior to being fabricated into the structure of a porous air electrode. This way, carbon used to make the air facing side of this electrode will already be hydrophobic. This should help the air-facing side retain its water repellency.

Any other material that may be used in fabricating air electrodes (which may include any of the material discussed elsewhere herein) or which may be included for their absorption or treatment properties may be deliberately made hydrophobic or hydrophilic prior to being fabricated into the structure of the air electrodes. Any material used in fabricating air electrodes may have any desired surface or material property prior to being fabricated into the structure of the air electrodes. Thus, when the air electrodes are fabricated they may have the desired property (e.g., hydrophobic or hydrophilic).

In some embodiments, materials having desired properties may be fabricated into a region of the air electrode. For example if it is desired for one surface of the air electrode to be hydrophobic and another to be hydrophilic, hydrophobic materials may be arranged on one side and hydrophilic materials may be arranged on the other side, so that when the air electrode is fabricated, the desired properties are at the desired location.

One or more features, characteristics, components, materials, or steps known in the art may be incorporated within the invention, and vice versa. See, e.g., U.S. Pat. Nos. 4,168,349, 4,463,067, 5,242,763, 5,306,579, 6,235,418, U.S. Patent Publication No. 2006/0141340, U.S. Patent Publication No. 2008/0096061, PCT Publication No. WO 2007/144357, WO 2007/065899, which are hereby incorporated by reference in their entirety.

Example

Figure 7:
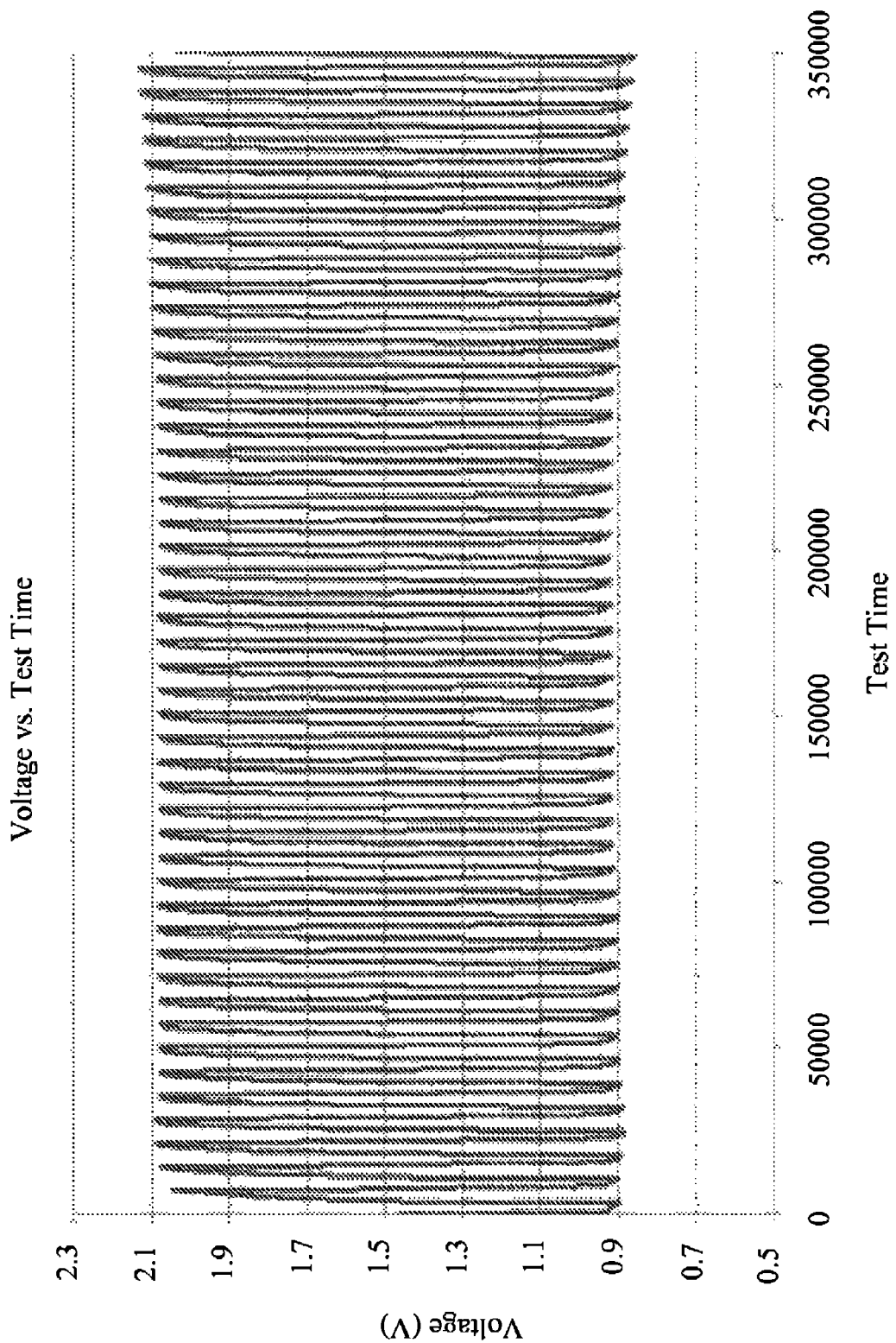
FIG. 7 shows an example of voltage over test time.

Shown below in FIG. 7 is a test of stability and operation of a bifunctional air electrode fabricated as described herein. This air electrode was cycled ~50 times from charging (anodic) to discharging (cathodic) over 350,000 seconds.

The electrode was made with a current collector made from 0.015 thick expanded titanium screen that was expanded 50%. The carbon-based layers were made with activated carbon and $MnO_2$ catalyst and graphite. A Gore-Tex™ membrane was used as the hydrophobic gas-diffusion layer. The electrolyte was 20% $NH_4Cl$ and 5% LiCl with varying $ZnCl_2$ depending on the state of charge of the cell during the cycle.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A bifunctional air electrode for a metal-air battery or cell, said air electrode comprising:
at least one current collector having:
a corrosion-resistant outer layer comprising TiC; and
a conductive inner layer comprising Ti; and
an air permeable, hydrophobic catalytic membrane, wherein the corrosion-resistant outer layer has a greater corrosion resistance than the conductive inner layer and the conductive inner layer has a higher level of electrical conductivity than the corrosion-resistant outer layer.

2. The bifunctional air electrode of claim 1, wherein the conductive inner layer is sandwiched within or coated by the corrosion-resistant outer layer.

3. The bifunctional air electrode of claim 1, wherein the conductive inner layer further comprises at least one of the following: $LiVTiO_4$, $LiVTiO_3$, or $LaTiO_3$.

4. The bifunctional air electrode of claim 1, wherein fullerenes are electrochemically deposited from either an aqueous or non-aqueous solvent on the current collector.

5. The bifunctional air electrode of claim 1, wherein carbon nanotubes (CNT) are deposited on the current collector.

6. The bifunctional air electrode of claim 1, wherein the current collector further comprises glassy carbon that is coated on a substrate with a resin and pyrolysed in an inert atmosphere.

7. The bifunctional air electrode of claim 1, wherein the corrosion-resistant outer layer comprises a powder coating that coats the conductive inner layer.

8. The bifunctional air electrode of claim 1, further comprising a porous carbon-based coating on the current collector.

9. The bifunctional air electrode of claim 1, further comprising a catalytic membrane that includes a catalyst selected from the group consisting of: metals, salts, or compounds containing one or more of the following: Mn, Co, Pt, Mo, Pd, or mixtures thereof.

10. The bifunctional air electrode of claim 1, wherein the catalytic membrane acts as a catalyst to affect the reduction of oxygen or the generation of oxygen from water.

11. The bifunctional air electrode of claim 10, wherein the catalytic membrane further comprises an air permeable, silicone rubber.

12. The bifunctional air electrode of claim 10, wherein the catalytic membrane comprises an air permeable and hydrophobic material comprising at least one of the following: dimethyl silicone, fluorosilicone, nitrile silicone, natural rubber, ethyl cellulose, or low density polyethylene.

13. A bifunctional air electrode for a metal-air battery or cell comprising:
a current collector comprising:
a corrosion-resistant outer layer comprising TiC; and
a conductive inner layer comprising Ti; and
a catalytic membrane that is attached to a surface of the current collector,
wherein the catalytic membrane is air permeable and hydrophobic.

14. The bifunctional air electrode of claim 13, wherein at least a portion of the conductive inner layer is sandwiched within or coated by the corrosion-resistant outer layer.

15. The bifunctional air electrode of claim 14, wherein the current collector further comprises a perforated material, an expanded screen, or a woven structure.

16. The bifunctional air electrode of claim 14, wherein the conductive inner layer further comprises $LiVTiO_4$, $LiVTiO_3$, $LaTiO_3$, or any combination thereof.

17. The bifunctional air electrode of claim 14, wherein the corrosion-resistant outer layer further comprises a powder coating.

18. The bifunctional air electrode of claim 14, wherein the catalytic membrane comprises a porous carbon-based coating.

19. The bifunctional air electrode of claim 14, wherein the catalytic membrane comprises glassy carbon.

20. The bifunctional air electrode of claim 14, wherein the current collector further comprises fullerenes.

21. The bifunctional air electrode of claim 14, wherein the current collector further comprises carbon nanotubes.

22. The bifunctional air electrode of claim 14, wherein the catalytic membrane further comprises a catalyst comprising Mn, Co, Pt, Mo, Pd, any salt thereof, or any mixture thereof.

23. The bifunctional air electrode of claim 14, wherein the catalytic membrane affects the reduction of oxygen or the generation of oxygen from water.

24. The bifunctional air electrode of claim 14, wherein the catalytic membrane further comprises an air permeable silicone rubber.

25. The bifunctional air electrode of claim 14, wherein the catalytic membrane further comprises an air permeable and hydrophobic material comprising dimethyl silicone, fluorosilicone, nitrile silicone, natural rubber, ethyl cellulose, low density polyethylene, or any combination thereof.

* * * * *